United States Patent
Wagner

(10) Patent No.: US 6,590,669 B1
(45) Date of Patent: Jul. 8, 2003

(54) METHOD FOR OPTICALLY DETECTING THE SHAPE OF OBJECTS

(76) Inventor: Christoph Wagner, Spordorfer Strasse 15, D-91054 Erlangen (DE)

(*) Notice: Subject to any disclaimer, the term of this patent is extended or adjusted under 35 U.S.C. 154(b) by 0 days.

(21) Appl. No.: 10/018,129
(22) PCT Filed: Apr. 26, 2000
(86) PCT No.: PCT/EP00/03706
§ 371 (c)(1), (2), (4) Date: Mar. 20, 2002
(87) PCT Pub. No.: WO00/66973
PCT Pub. Date: Nov. 9, 2000

(30) Foreign Application Priority Data

Apr. 30, 1999 (DE) .......................... 199 19 963

(51) Int. Cl.$^7$ .............................................. G01B 11/00
(52) U.S. Cl. .......................... 356/601; 358/93; 358/107
(58) Field of Search ............................. 356/600, 601, 356/614, 622–625, 631, 388, 390, 398; 382/154; 358/93, 107–108

(56) References Cited

U.S. PATENT DOCUMENTS

| | | | |
|---|---|---|---|
| 3,840,739 A | | 10/1974 | Coulter |
| 4,791,482 A | | 12/1988 | Barry et al. |
| 4,928,175 A | * | 5/1990 | Haggren ..................... 358/108 |
| 5,446,798 A | * | 8/1995 | Morita et al. ............... 382/154 |
| 5,754,680 A | * | 5/1998 | Sato et al. .................. 356/614 |

FOREIGN PATENT DOCUMENTS

| | | |
|---|---|---|
| GB | 2328280 | 2/1999 |
| WO | 9705449 | 2/1997 |

* cited by examiner

Primary Examiner—Frank G. Font
Assistant Examiner—Sang H. Nguyen
(74) Attorney, Agent, or Firm—Ostrolenk, Faber, Gerb & Soffen, LLP

(57) ABSTRACT

A method for optically detecting the shape of a three-dimensional object by a) positioning an object, at least one light source and at least one camera each in a selected first position in three dimensions, b) detecting the respective selected first positions of the object, of the light source and of the camera, c) illuminating the object by the light source with the object, the light source, and the camera in their respective first positions, d) recording images of the illuminated object while the object, the light source and the camera are in their respective first positions; e) repeating steps a)–d) for a plurality of additional positions of the object, the light source and the camera, f) determining the surface normal to a plurality of surface points on the object from the corresponding positions on a plurality of the recorded images using a photometric stereo technique, g) identifying corresponding image points in a plurality of the recorded images from the corresponding surface normals using a binocular stereo technique, h) determining a plurality of image point vectors from the sets of corresponding image points and respective object surface normals, and i) defining the three-dimensional shape of the object from the image point vectors, and the respective positions of the camera, the light source and the object.

16 Claims, 2 Drawing Sheets

METHOD FOR OPTICALLY DETECTING THE SHAPE OF OBJECTS

BACKGROUND OF THE INVENTION

The invention relates to a stereo optical method for recording the shape of three-dimensional objects.

In many industrial production fields and in the multimedia applications field, methods are now required in order to convert geometric, three-dimensional data relating to an object to numerical data on a computer, by means of suitable measurement devices. This may be done for quality control purposes, or else with the aim of displaying these objects realistically and three-dimensionally to a human observer. There is also a large amount of interest in recording objects automatically, and of transmitting them and visualizing them using the Internet.

Optical methods for recording the shape of objects are increasingly replacing the previously used mechanical scanning methods. A major advantage of the optical methods is that the measurement does not involve any contact and thus has no mechanical influence on the object. A further advantage is that a large number of object points can be recorded simultaneously, thus shortening the measurement time.

Known shape recording methods are generally based on the triangulation principle, the stereo principle or interferometric techniques.

In one known triangular method, a light point is projected onto the surface of the object to be measured, and is observed from a direction other than the illumination direction. The coordinates of the illuminated points can be calculated from the knowledge of the orientation of the projection beam in three dimensions, and of the direction from which the observed point is perceived. Although the method is accurate and unambiguous, it is slow, however, since the surface of the object to be measured must be scanned point-by-point. Furthermore, the only points on the surface which can be recorded are those which are visible directly both from the location of the light source and from an observing camera. A data record containing such a measurement is thus never complete. Although a number of data records can be obtained by repeated measurements using different observation and illumination perspectives, it is necessary, however, in order to record the shape of the object in its totality, to relate these data records to one another geometrically (matching), and this frequently still requires action by a human user. Furthermore, during matching, the interfaces between the data records also have an unpleasant appearance since the individual data records can rarely be made to coincide perfectly. Edges and sudden changes can occur as artifacts, which not only adversely affect the accuracy of the data but, in particular, also cause visual disturbance to a viewer. The human eye is able to identify even very small projections and indentations in the surface of a visualized or actual object. In addition to the position of a point in three dimensions, people can also deduce the inclination of the surface from the illumination conditions. Even minor variations in position can cause a major change in the inclination, as a result of which even very small irregularities are susceptible to a human observer. This is generally a fundamental problem in most methods for three-dimensional recording of shapes. In most cases, the recording of measured data is not matched to this situation, so that even a small amount of noise in the data has a very disturbing effect on the viewer. This also applies to the known methods described in the following text.

Further-developed methods based on triangulation include the light section technique and strip projection. In the former, a line is projected onto the surface of the object to be measured, rather than an individual point. This line is observed from a direction that is different from the illumination direction. The three-dimensional coordinates of the illuminated points are obtained in the same way as that mentioned above. Although this method is faster than point-by-point triangulation, it is, however, still slower than other methods which can record an entire surface in one step. In this case as well, a number of measurements are required from different perspectives, which are then matched in order to produce a complete representation of the object.

Strip projection is a further development of the light section technique, in which a number of lines are projected simultaneously onto the surface of the object to be measured. The intensity of these lines varies cyclically in the lateral direction, and makes it possible for the observation camera to distinguish between the individual lines. Although the method is fast, it is also necessary to join a number of measurements together by matching, so that the edges and sudden changes mentioned above can also occur here.

Interferometric methods are frequently used for high-precision measurements. These methods are also subject to the problem that the results of a number of individual measurements must be jointed together in order to produce a complete three-dimensional representation of the object being measured. Furthermore, these methods are very sensitive to very minor vibration, and can generally be used only in laboratory conditions.

A further group of methods is based on the stereo principle. These make use of the fact that two views of an object which have been recorded from different viewing angles contain information about the three-dimensional shape. These are referred to as binocular stereo methods. Software algorithms are used to identify corresponding features of the object in the two records. The different position of the feature in the two images represents a measure of the depth of the feature in three-dimensional space. The main object of binocular stereo is to determine the correspondence between features. One method is to compare small image details with one another on the basis of their brightness structure. Two difficulties occur in the process. If image details have no significant brightness structures, they cannot be associated with one another. This means that the three-dimensional depth of object points can be determined only in structured areas of the object. Furthermore, the brightness, to be more precise the light intensity, of an object is not the same from different viewing angles. This can likewise lead to it being impossible to determine depth.

The binocular stereo principle can be extended from two views to a number of views. This provides further information and makes the correspondence analysis process more reliable, but in many cases this is still not sufficient.

A further group of stereo methods uses different illumination conditions to determine the shape of objects. In contrast to the binocular stereo method, the viewing angle remains fixed, and the illumination direction is varied. This is thus referred to as a photometric stereo method. The brightness levels from the individual lighting directions make it possible to deduce the inclination of the object surface. In this case, a variable which forms the derivative of the three-dimensional depth is measured rather than the three-dimensional depth itself. Photometric stereo methods are highly suitable for measuring local object structures, but global structural measurements are still subject to errors. A global object structure can be established better by using a method which measures the three-dimensional depth itself, that is to say, for example, a binocular stereo method.

The methods mentioned above thus have the disadvantage that it is not always possible to uniquely associate associated image points on different images with one another. This is referred to as the correspondence problem.

SUMMARY OF THE INVENTION

The object of the invention is thus to specify a method for optical recording of shapes, in which the correspondence problem is at least very largely overcome.

This object is achieved by a method described below. This method allows both global and local object structures to be recorded accurately. These two principles are normally also used to a major extent in the way that humans viewing an object detect its shape. Measurements are therefore possible which are extremely realistic not only in terms of metric aspects but also in terms of visual aspects.

The method according to the invention thus allows inclination values to be used rather than brightness values for the correspondence analysis. This is because, in contrast to brightness values, inclination values do not vary with the viewing direction. The correspondence problem is also solved with the method according to the invention in that the surface normal to a surface point on the object is determined from different viewing directions. Image points with the same surface normals can thus unambiguously be associated with one another, easily and quickly.

Furthermore, the proposed method does not require an explicit matching procedure. This avoids artifacts at the interfaces between the individual records.

The proposed method according to the invention comprises the following steps:
  a) positioning of the object 1, of at least one light source 2 and of at least one camera 3 in a number of positions, in three dimensions,
  b) detection of the respective position of the object Gi, of the light source Li and of the camera Ki,
  c) illumination of the object 1 by the light source 2 in the positions Gi, Li, Ki,
  d) recording of images 4 of the object 1 in the positions Gi, Li, Ki,
  e) determination of the surface normals 5 to the object 1 from the positions Gi, Li, Ki and from the images 4,
  f) allocation of corresponding image points 6 in the images 4 by means of the surface normal 5,
  g) determination of the three-dimensional shape of the object from the positions Gi, Li, Ki, from the surface normals 5 and from corresponding image points 6.

BRIEF DESCRIPTION OF THE DRAWINGS

The invention will be explained in more detail in the following text using exemplary embodiments and with reference to the drawing, in which.

DESCRIPTION OF THE PREFERRED EMBODIMENTS

Figure 1:
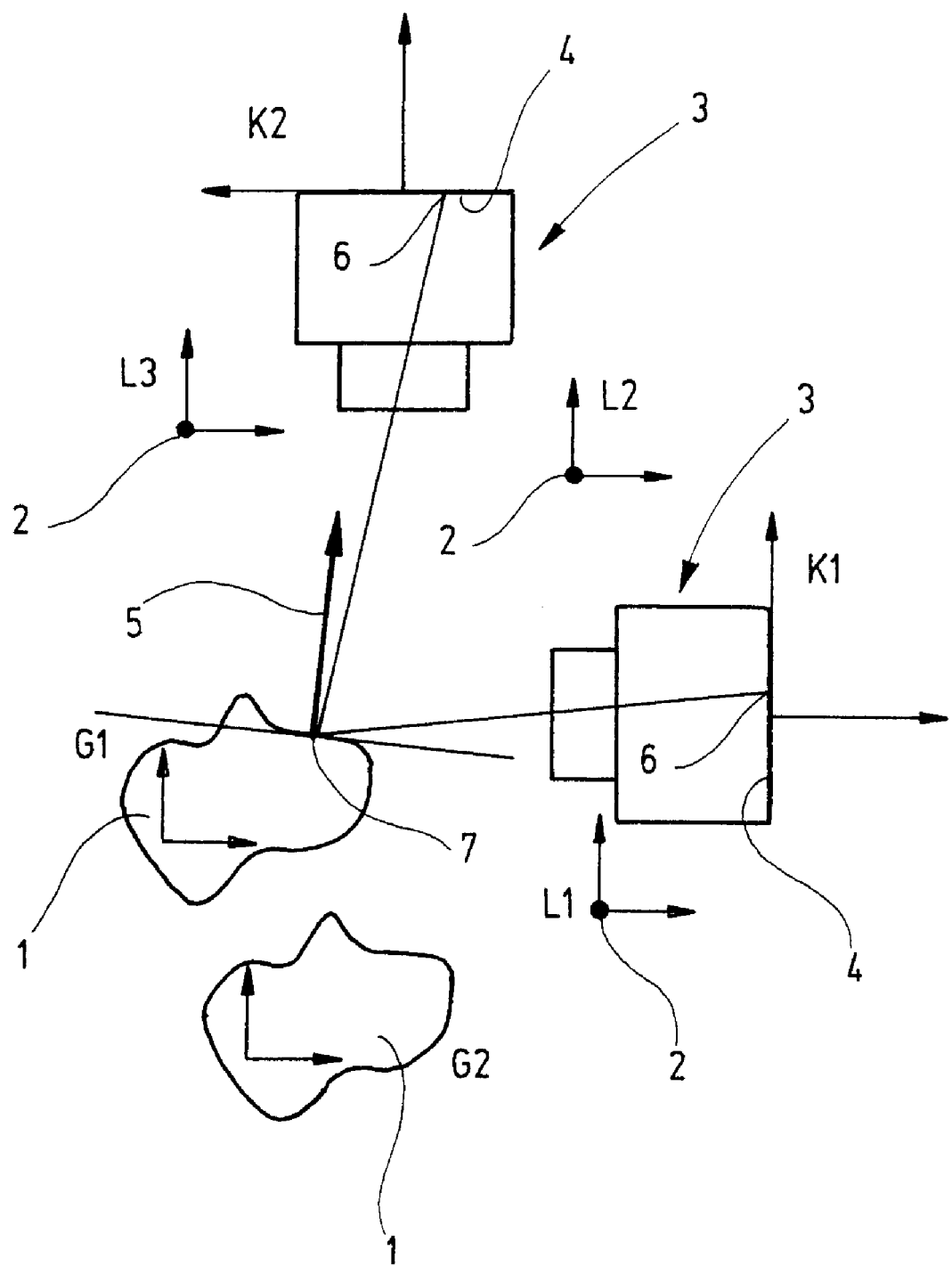
FIG. 1 shows, schematically, an apparatus for optically recording the shape of objects.

A three-dimensional object 1 to be measured is moved to the positions G1, G2, . . . Gi, at least one light source 2 is moved to the positions L1, L2, L3, . . . Li and the camera 3 is moved to positions K1, K2, . . . Ki (see FIG. 1). This can be done by at least one movement apparatus, for example a displacement unit, a conveyor belt, a rotating table or a robot, which is known per se. This option is very highly suitable for automated measurement processes on a large number of identical objects 1. It is likewise possible for a user to position the object 1, the light source 2 and the camera 3 freely in three dimensions, as required. Portable, hand-held shape recording systems are of major interest for measuring individual objects which require a high level of flexibility. Combinations of mechanical guidance and free handling are likewise feasible. Thus, for example, a light source 2 may be rigidly mounted on the camera 3 (special case of mechanical guidance), but with the unit comprising the camera 3 and the light source 2 being freely moveable. It is also feasible to use a number of light sources 2 which are mounted in fixed positions and are used successively, which is equivalent to the positioning of an individual light source 2 in different positions. Analogously to this, a number of cameras 3 may also be used, which is equivalent to positioning a single camera 3 in different positions. A number of objects 1 may likewise be included.

Figure 2:
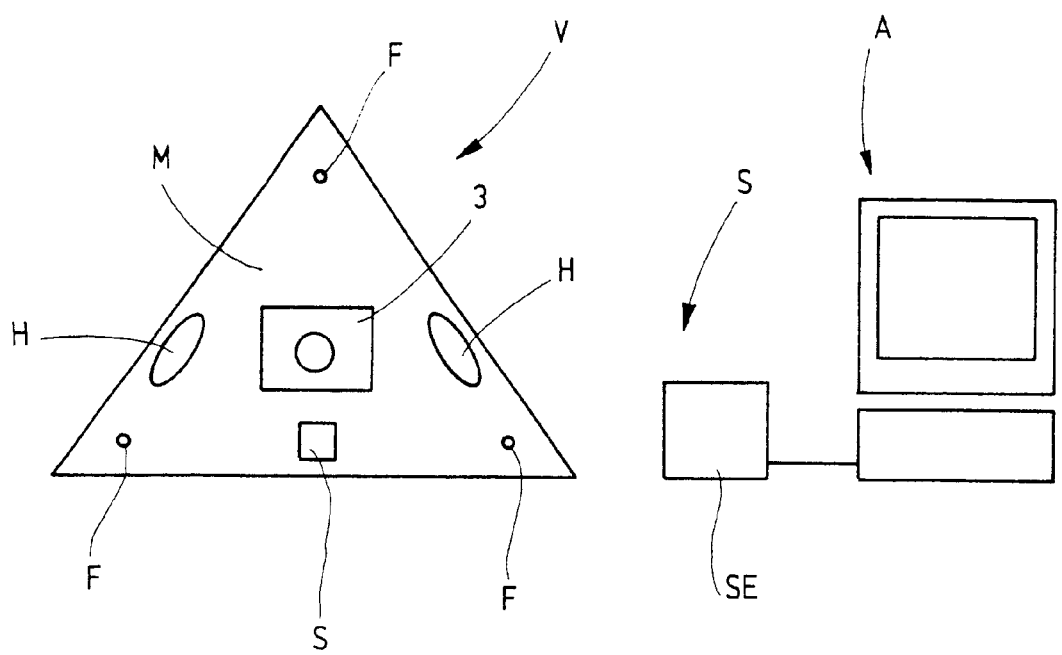
FIG. 2 shows a portable apparatus for optically recording the shape of objects.

For the rest of the measurement procedure, it is important to know the positions of the object 1 (Gi), of the light source (Li) and of the camera 3 (Ki). Firstly, the position Gi, Li or Ki may be given in implicit form. If mechanical guidance is used, then, to be precise, the orientation and positions Gi, Li and Ki are governed by the guidance geometry. Using the example of a computer-controlled displacement unit (not illustrated), it is easy to see that the position of the drive unit is known, and can be transferred from it. If the object 1, the light source or the camera 3 is mounted in a fixed position, its position and orientation can be established once, and can be used for all the further measurements. On the other hand Gi, Li and Ki may be established by explicit measurement. This situation is particularly appropriate for hand-held measurement devices. This may be done by means of an additional sensor S, which follows the position Gi, Li or Ki. Such sensors S are produced industrially and operate, for example, on photogrametric, inertia-based, ultrasound or else magnetic principles. The measurement principle will be described in more detail using the example of a magnetically operating sensor S (FIG. 2). The magnetic sensor system comprises a transmitter SE mounted in a fixed position, and preferably a number of receivers E, which can be attached to the object 1, to the light source 2 and/or to the camera 3. Both the transmitter SE and the receivers E may have their own associated Cartesian coordinate systems. The position and orientation Gi of the object: 1 is now given by the relationship between the transmitter coordinate system and the receiver coordinate system of the object 1. A corresponding situation applies to the light source 2 and the camera 3. The relationship between two coordinate systems can be described by coordinate transformation. In order to position rigid bodies in three dimensions, this coordinate transformation has six, and only six, degrees of freedom, three for displacement in the three spatial directions, and a further three for rotation in space. There are a range of options for defining displacement and rotation. The displacement may be defined by a vector with three dimensions, while rotation can be defined by means of three Euler angles. Other rotation representations are possible, for example by defining what are referred to as quaternions.

A further form of representation is based on matrix notation. Here, what is referred to as a "rotation matrix" may be defined. Position and orientation sensors with six degrees of freedom generally provide the coordinate transformation as a measured value in the form of a translation and rotation in one of the representations mentioned above, or in representations derived from them. This field will not be described in any more detail and all that is necessary is to explain that all the required measured values can be provided.

The light source 2 which illuminates the object 1 to be measured is preferably chosen to be virtually in the form of a point source. This offers the advantage that the photometric stereo method described in the following text can be carried out easily. Feasible light sources include, for example, flash lamps, halogen lamps, external light sources 2 with glass fibers, or high-power light-emitting diodes.

An electronically operating camera 3 is preferably used as the camera 3, whose images 4 can easily be recorded and further processed by a computer, which is known per se. This is preferably a digital camera 3. An individual image 4 is recorded for each chosen combination of the positions Gi, Li and Ki. What is referred to as the surface normal 5 to a point 7 on the object 1 is then established from the known positions Gi, Li and Ki, and from the images 4. The expression surface normal 5 means a vector which is at right angles to a surface element 7 on the surface of the object 1. This is a normal measure of the position, orientation and inclination of the surface in three dimensions. There are a number of methods which are used successfully for determining the inclination of surfaces by optical means. One fundamental method, which is referred to as the photometric stereo method, can be used for the described method. For photometric stereo, both the camera 3 and the object 1 initially remain at the same location, while a light source 2 assumes different positions in three dimensions. An image 4 is recorded in each of these positions. In many cases, it is worthwhile selecting three, and only three positions for the light source 2, since the surface normal 5 is established unambiguously in this way. In order to establish three unknowns, namely the three components of the normal vector, three, and only three illumination directions are required. It is preferable not to move a light source 2 to three positions, but to use three different light sources 2, and in each case to use one of them to illuminate the object 1. The three light sources 2 are preferably mounted in fixed positions on the camera 3 (see FIG. 2). The light intensities recorded in the images 4, and the positions Gi, Li and Ki are now logically linked such that this results in the surface normal 5 to the surface point 7 of the object. In this case, a model of the object 1 is used as the basis for its emission characteristic for the incident light. One basic model of the emission characteristic is referred to as the "Lambert radiating element". A Lambert radiating element transmits incident light uniformly in all spatial directions. This model applies, to a good approximation, to objects which reflect diffusely. Particularly simple relationships are obtained by using point light sources 2. Area light sources are also possible, and can be regarded as an interaction of a large number of point light sources. Refined models have been developed for objects with a proportion of mirror-like reflection. The photometric stereo method is repeated for further positions Gi and Ki. The mathematical and physical backgrounds will not be described in detail here, the critical factor being that it is possible to establish the surface normal 5 to an object 1 by means of photometric stereo methods.

The next method used is what is referred to as binocular stereo method. This means that corresponding image points 6 are determined in the recorded images 4. These are used to deduce the orientation of the object points 7 corresponding to the image points 6 in three dimensions. Previous correspondence analysis methods have generally been based on the light intensity recorded in the images 4. This is dependent on the corresponding points being detectable by virtue of them having the same light intensity, or at least a similar intensity pattern. Unfortunately, this situation often occurs only as an approximation, and therefore frequently fails. In general, it can be said that the light intensity varies with the position of the camera 3, even if the light source 2 is not moved. A similar situation applies to the color characteristics.

However, the behavior of the surface normal 5 to an object 1 is completely different. This does not vary with the position of the camera 3 and light source 2. This fact may be cited as a major advantage of the proposed method according to the invention. Correspondence analysis can be carried out considerably more reliably, since it is based on a variable which does not vary with position.

As normal in the case of binocular stereo methods, the position and orientation of the associated points on the object in three dimensions is deduced from the correspondence between the image point 6, based on geometrical relationships and knowledge of camera parameters. Since a large number of views of the object 1 may be included in the proposed method, it is possible to record the object shape largely from all sides. In the described stereo method, all the views are combined to form a single, three-dimensional view of the object 1. This avoids the need to explicitly join three-dimensional image elements together, as in the other methods. The fact that such an explicit matching procedure can be avoided can be cited as a further major advantage of the method described.

Furthermore, the human eye is able to identify even very small projections and indentations in the surface of a visualized or actual object. In addition to the position of a point in three dimensions, people can also deduce the inclination of the surface from the lighting conditions. The inclination of a surface may be regarded as a derivative of the location. Even minor variations in position can cause a major change in the inclination, as a result of which even very minor irregularities are perceived by a human observer. This is a fundamental problem in most methods for three-dimensional recording of shapes. The recording of measured data is in most cases not matched to this situation, so that even minor noise in the data has a very disturbing effect to the viewer. The information relating to the surface normal 5 that has already been obtained is thus also used, in addition to the correspondence analysis, to improve the three-dimensional measured values. Unavoidable errors in the measurement of the location are corrected by knowledge of the surface normal 5. In this case, measurement errors relating to the position of object points are mainly eliminated, but the curvature at any point on the surface is essentially maintained. This leads to the expectation of a drastic improvement in the measurement accuracy over stereo methods operating on a binocular basis. In addition to improved metric accuracy, an improved visual impression can also be expected, since human vision can assess variations in the surface normals of three-dimensional objects very precisely. The proposed method is thus matched to the specific characteristics of human vision, and allows particularly realistic three-dimensional visualization.

An example of an handheld apparatus V, which is suitable for carrying out the method, is described in the following text with reference to FIG. 2. In addition to a preferably magnetically operating position sensor S and a CCD camera 3, the apparatus V has three optical fibers F, which are connected to an external light source (not shown). The camera 3, the receiver E for the position sensor S and the fiber ends F, which thus form the light sources 2, are mounted on a mounting plate M, which may be designed to be portable, and preferably has handles H for this purpose. The mounting plate M can also be moved or displaced automatically. The images recorded by the camera 3 and the signals from the position sensor S are supplied to an evaluation unit A, and are evaluated. This evaluation device A is preferably in the form of a computer, using which the surface normals 5 are established, as described above. FIG. 2 thus shows an apparatus V for carrying out the method according to the invention for optical recording of shapes.

What is claimed is:

1. A method for optically detecting the shape of a three-dimensional object comprising the steps of:
   a) positioning an object, at least one light source and at least one camera each in a selected first position in three dimensions;
   b) detecting the respective selected first positions of the object, of the light source and of the camera;
   c) illuminating the object by the light source with the object, the light source, and the camera in their respective first positions;
   d) recording images of the illuminated object while the object, the light source and the camera are in their respective first positions;
   e) repeating steps a)–d) for a plurality of additional positions of each of the object, the light source and the camera;
   f) determining the surface normal to a plurality of surface points on the object from the corresponding positions on a plurality of the recorded images using a photometric stereo technique;
   g) identifying corresponding image points in a plurality of the recorded images from the corresponding surface normals using a binocular stereo technique;
   h) determining a plurality of image point vectors from the sets of corresponding image points and respective object surface normals; and
   i) defining the three-dimensional shape of the object from the image point vectors, and the respective positions of the camera, the light source and the object.

2. The method as claimed in claim 1, further comprising guiding at least one of the object, the light source and the camera by a hand of a user.

3. The method as claimed in claim 1, further comprising guiding at least one of the object, the light source and the camera by a mechanical apparatus.

4. The method as claimed in claim 1, further comprising additionally sensing and recording the position of at least one of the object, the light source and the camera.

5. The method as claimed in claim 4, wherein the additional sensing is determined by a photogrametric, inertia-based, ultrasound-operating or magnetically operating sensor.

6. The method as claimed in claim 1, wherein at least three light sources are used, each at a respective one of the plurality of positions thereof.

7. The method as claimed in claim 6, further comprising mounting the light sources at fixed positions relative to the camera.

8. The method as claimed in claim 1, wherein the light source provides substantially point-source illumination.

9. The method as claimed in claim 1, wherein:
   the method further includes mounting three light sources and a camera at fixed positions on a portable device;
   step a) includes positioning the portable device at a first location corresponding to the selected first positions of the camera and light source; and
   step c) includes illuminating the object by each of the three light sources while the portable device is at the first location;
   step d) includes recording images of the object illuminated by each of the light sources while the portable device is at the first location;
   step e) includes:
      positioning the portable device at a plurality of further locations corresponding to the selected plurality of positions of the camera and light source; and
      illuminating the object by each of the three light sources while the portable device is at each of the plurality of further locations; and
      recording images of the object illuminated by each of the light sources while the portable device is at each of the plurality of further locations.

10. The method as claimed in claim 9, wherein there are exactly three light sources.

11. The method as claimed in claim 9, wherein the photometric stereo technique includes determining the surface normals by analyzing three images recorded by illuminating the object with each of the three light sources for each location of the portable device.

12. The method as claimed in claim 9, wherein the binocular stereo technique includes determining the position and orientation of points on the object from correspondence between points in multiple images of the object points taken from different camera viewpoints.

13. The method as claimed in claim 9, further comprising the step of mounting a sensor on the portable device which is operative to detect the relative position of the object.

14. The method as claimed in claim 13, wherein the sensor functions by photogrammetry, inertia, ultrasound or magnetism.

15. The method as claimed in claim 1, wherein the photometric stereo technique includes determining the surface normals by analyzing three images recorded by illuminating the object from three positions relative to the camera for each position of the camera relative to the object.

16. The method as claimed in claim 1, wherein the binocular stereo technique includes determining the position and orientation of points on the object from correspondence between points in multiple images of the object points taken from different camera viewpoints.

* * * * *